US008009154B2

(12) United States Patent
Lee

(10) Patent No.: US 8,009,154 B2
(45) Date of Patent: Aug. 30, 2011

(54) PLASMA DISPLAY DEVICE AND METHOD OF DRIVING THE SAME

(75) Inventor: Sungsu Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1056 days.

(21) Appl. No.: 11/835,698

(22) Filed: Aug. 8, 2007

(65) Prior Publication Data

US 2008/0158213 A1 Jul. 3, 2008

(30) Foreign Application Priority Data

Dec. 27, 2006 (KR) ........................ 10-2006-0135385

(51) Int. Cl.
*G06F 3/038* (2006.01)

(52) U.S. Cl. .......................................... 345/204; 345/60

(58) Field of Classification Search .............. 345/60–63, 345/67–68, 204, 208–210; 315/169.4
See application file for complete search history.

(56) References Cited

FOREIGN PATENT DOCUMENTS

| | | | |
|---|---|---|---|
| JP | 2006-317856 | | 11/2006 |
| KR | 2004-94493 | | 11/2004 |
| KR | 2004094493 | A * | 11/2004 |
| KR | 2005-75674 | | 7/2005 |
| KR | 2006-109545 | | 10/2006 |

* cited by examiner

*Primary Examiner* — Richard Hjerpe
*Assistant Examiner* — Carolyn R Edwards
(74) *Attorney, Agent, or Firm* — Christie, Parker & Hale, LLP

(57) ABSTRACT

A plasma display device to generate a stable reset discharge and to reduce background luminance and a method of driving the same. The plasma display device produces images by dividing the frames of displayed images into a plurality of sub-fields, which include a reset period, an address period, and a sustain period. The method includes: supplying a first main reset pulse in the reset period of ith frames (where, i is natural number); and supplying second and third main reset pulses in reset periods of (i+1)th frames, which are alternatively produced with the ith frames. The first main reset pulse having a different voltage than the second and third main reset pulses.

15 Claims, 6 Drawing Sheets

PLASMA DISPLAY DEVICE AND METHOD OF DRIVING THE SAME

CROSS-REFERENCE TO RELATED APPLICATION

This application claims the benefit of Korean Application No. 2006-135385, filed Dec. 27, 2006, the disclosure of which is incorporated herein by reference.

BACKGROUND OF THE INVENTION

1. Field of the Invention

Aspects of the present invention relate to a plasma display device and a method of driving the same.

2. Description of Related Art

A plasma display device is a display device that uses a plasma display panel (PDP) generally includes a plurality of light emitting cells disposed in a matrix.

The PDP is driven by dividing a frame, for displaying a single image, into several sub-fields. Different gradation weights can be allocated to the subfields. The subfields are selectively operated to set the visual brightness (gradation) for each cell of the PDP. Each sub-field is divided into a reset (initialization) period, an address (write) period, for selecting light emitting cells and non-light emitting cells, and a sustain (display) period, for sustaining a discharge of the light emitting cells to display an image. Further, the gradation of the image is determined, by combining the weight of each of the sub-fields, during which the cells emit light.

The reset periods can be classified as main reset periods and sub-reset periods, depending on the duration and/or intensity of a reset pulse applied during the period. The main reset periods generally have a longer duration and/or higher voltage reset pulse than the sub-reset periods. When one frame includes sub-fields having main reset periods and sub-reset periods, black luminance (background luminance) may be relatively reduced, but the reset discharges may be unstable.

When a frame includes at least two sub-fields having main reset periods, and other sub-fields having sub-reset periods, the reset discharge may be stably generated. However, since the reset discharge occurs twice, the amount of light generated becomes relatively large, and the black luminance level becomes relatively high, interfering with dark room viewing.

SUMMARY OF THE INVENTION

An aspect of the present invention provides a plasma display device (PDP) that stably generates reset discharges and reduces black (background) luminance. The present teachings encompass a method of driving the PDP. The PDP can be driven by dividing one image frame (herein after frame) into a plurality of sub-fields. The sub-fields can each include a reset (initialization) period, an address (write) period, and a sustain (display) period. The method can include: supplying one or more main reset pulses, during one or more reset periods of an ith frame and supplying one or more main reset pulses in one or more reset periods of an (i+1)th frame, with i being a natural number. The ith and (1+i)th frames are alternatively driven to produce two frames. The number of main reset pulses supplied in the (i+1)th frames is larger than the number of main reset pulses supplied to the ith frame. The main reset pulses supplied in the ith frames are different from the main reset pulses supplied in the (i+1)th frames.

The supplying of the main reset pulse to ith frames may include supplying a first main reset pulse during a reset period of any one sub-field included in the ith frames and supplying a sub-reset pulse during the reset periods of the other sub-fields in the ith frames.

The supplying of the main reset pulse to the (i+1)th frames may include supplying a second and a third main reset pulse in any consecutive sub-fields included in the (i+1)th frames, and supplying the sub-reset pulses in the other sub-fields of the (i+1)th frames.

The first main reset pulse may have a first rising period, during which a voltage of the first reset pulse increases from a first voltage to a second voltage. The second main reset pulse may have a second rising period during which a voltage of the second reset pulse increases from the first voltage to a third voltage, which is lower than the second voltage. The second rising period can be shorter than the first rising period. The third main reset pulse may have a third rising period during which a voltage of the third reset pulse increases from the first voltage to a fourth voltage, which is lower than the third voltage. The third rising period can be shorter than the second rising period. The sum of the lengths of second rising period and the third rising period may be less than twice the length of first rising period.

The reset pulses can cause a reset discharge in the cells of the PDP. The amount of light generated by the first main reset pulse, may be equal to, or less than, the amount of the light generated by the second and third main reset pulses combined.

Aspects of the present invention provide a plasma display device including: a plasma display panel; a controller; and a driver. The controller is to alternately control the driving of an ith frame and an (i+1)th frame and to divide the frames into a plurality of sub-fields. The sub-fields each include a reset period, an address period, and a sustain period. The driver supplies at least one main reset pulse, to the plasma display panel, during a reset period of the ith frame, and supplies two or more main reset pluses during reset periods of the (i+1)th frame. The number of main reset pulses supplied during the (i+1)th frame is greater than the number of main reset pulses supplied during the ith frame. The main reset pulse supplied during the ith frame is different from the main reset pluses supplied during the reset period of the (i+1)th frame.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
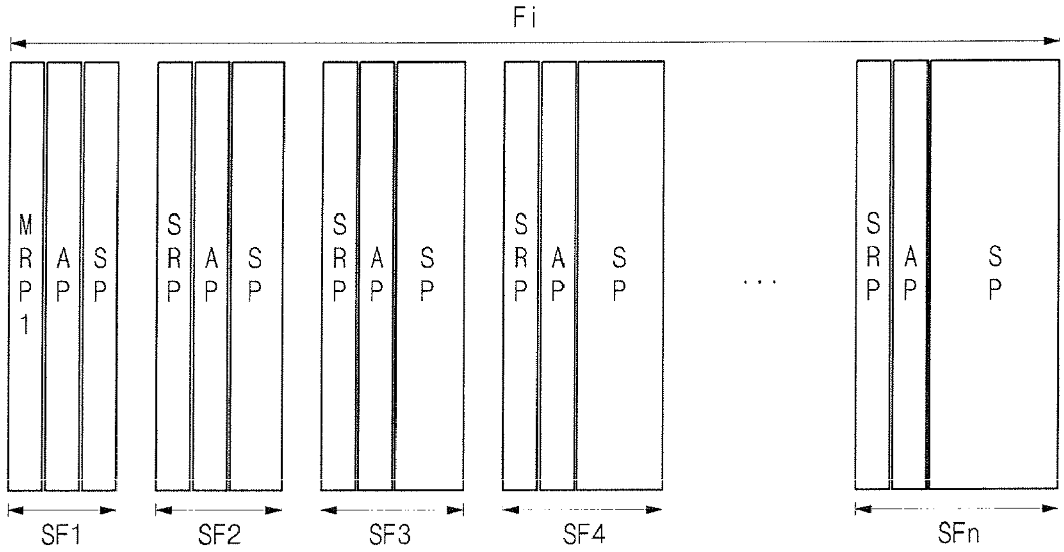
FIGS. 1A and 1B are views illustrating arrangement of sub-fields included in ith and (i+1)th frames, according to aspects of an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
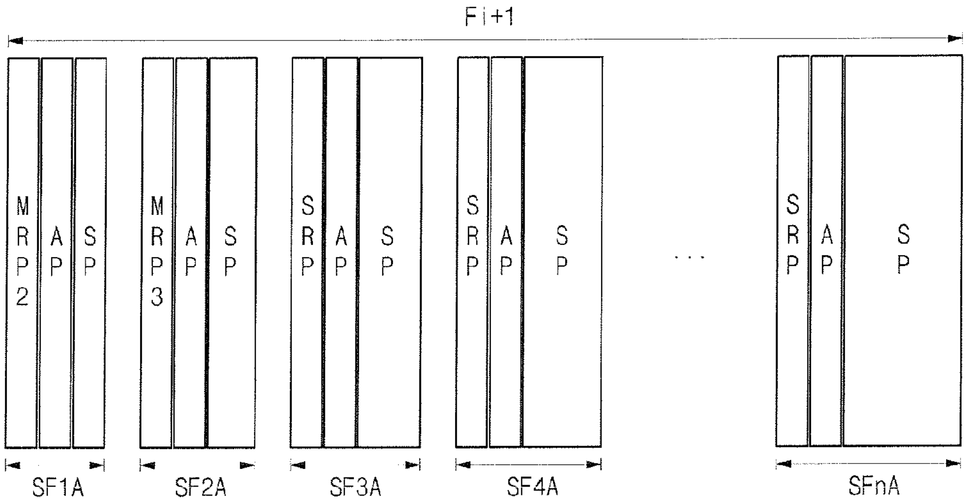

FIGS. 1A and 1B are views illustrating frames, used to display images in the plasma display device, according to an exemplary embodiment of the invention. As shown in FIGS. 1A and 1B, frames Fi and Fi+1 (where, i is natural number) are to display images, and are divided into a plurality of sub-fields SF1 to SFn and SF1A to SFnA respectively (where, n is natural number).

In particular, one sub-field of an ith frame Fi, shown in FIG. 1A, for example, a first sub-field SF1, is divided into: a first main reset period MRP1, during which a first main reset pulse 200 (FIG. 2A) is supplied; an address period AP; and a sustain period SP. Each of the second sub-field SF2 to nth sub-field SFn is divided into: a sub-reset period SRP, during which a sub-reset pulse is supplied; an address period AP; and a sustain period SP.

The first sub-field SF1A, of the (i+1)th frame Fi+1, shown in FIG. 1B, is divided into: a second main reset period MRP2, during which a second main reset pulse 202 (FIG. 2B) is supplied; an address period AP; and a sustain period SP. The second sub-field SF2A is divided into: a third main reset period MRP3, during which a third main reset pulse 204 (FIG. 2B) is supplied; an address period AP; and a sustain period SP. The third sub-field SF3A to the nth sub-field SFnA, are each divided into: a sub-reset period SRP, during which a sub-reset pulse is supplied; an address period AP; and a sustain period SP.

As shown in FIGS. 1A and 1B, the main reset periods MRP1, MRP2, and MRP3 and the sub-reset periods SRP are periods during which discharge cells of a PDP are initialized. The address periods AP are periods during which discharge cells are addressed, thereby selecting the cells to be turned on and thereby emit light. Non-selected discharge cells are not turned on and do not emit light. The sustain periods SP are periods during which a predetermined number of sustain discharges are applied to the addressed discharge cells, during the address periods AP. Herein, the predetermined number of sustain discharges may be adjusted as desired. The number of sustain discharges can relate to the gradation of a frame.

The ith frame Fi and the (i+1)th frame Fi+1 are alternatively driven with respect to each other. For example, the sub-frames of the frame Fi are driven and then the sub-fields of the frame Fi+1 are driven. The first main reset pulse 200, is different from the second and third main reset pulses 202 and 204.

Figure 2A:
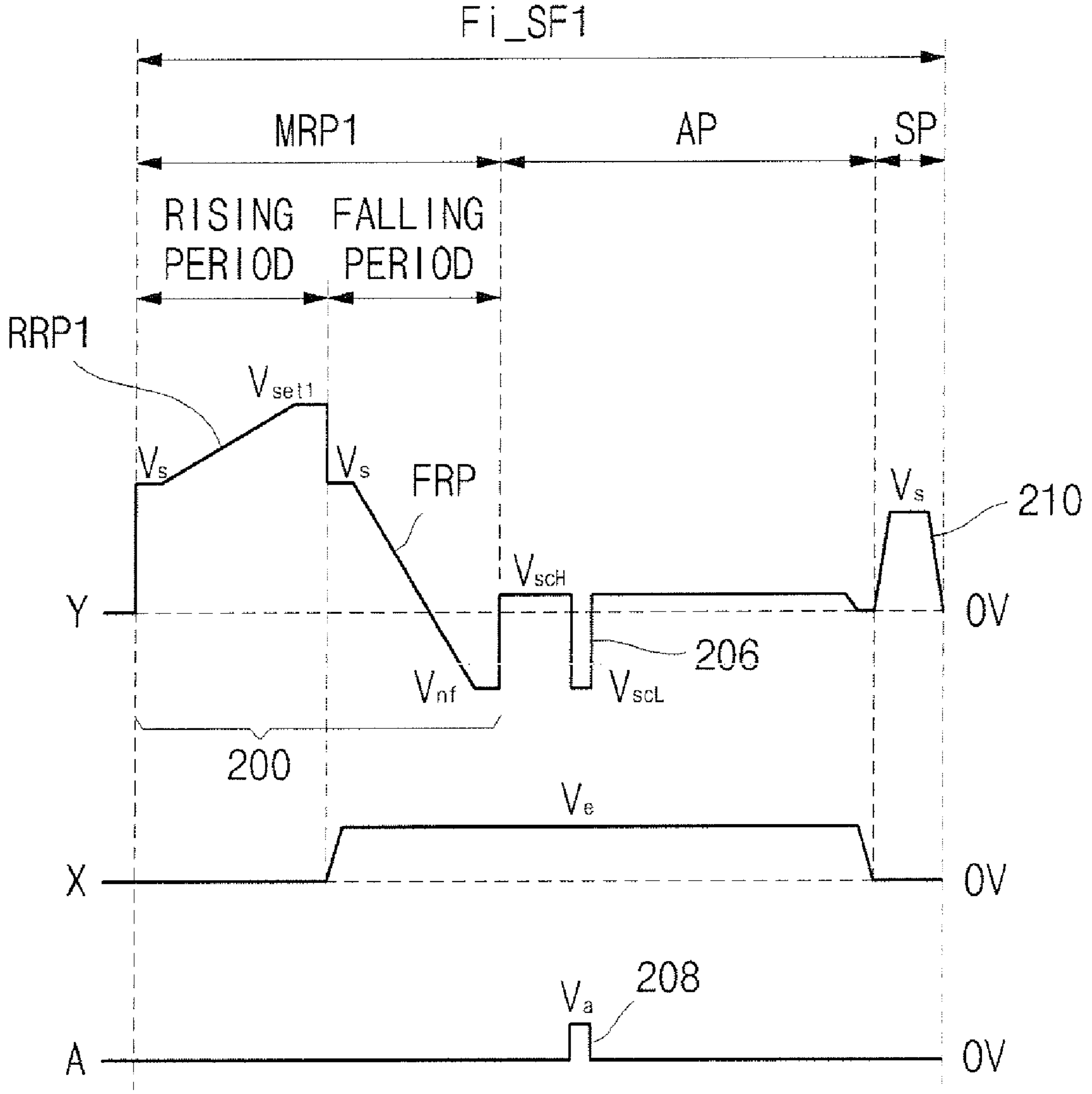
FIGS. 2A and 2B are views illustrating driving waveforms to be supplied to each of sub-fields included in the ith and (i+1)th frames, according to aspects of the invention.

As shown in FIG. 2A, the first main reset period MRP1 can be divided into a rising period and a falling period. During the first main reset period MRP1, the first main reset pulse 200, is supplied. The first main reset pulse 200 includes a first rising ramp pulse RRP1 and a falling ramp pulse FRP. The first rising ramp pulse RRP1 occurs during the rising period. During the rising period, a voltage of the first rising ramp pulse RRP1 is increased from a voltage Vs to a voltage Vset1. The first rising ramp pulse RRP1 is supplied to a scan electrode Y, while the sustain electrode X is maintained at a reference voltage 0V. A weak discharge occurs between the scan electrode Y and the sustain electrode X and between the scan electrode Y and an address electrode A, during the rising period, while the voltage of the scan electrode Y increases.

Figure 2B:
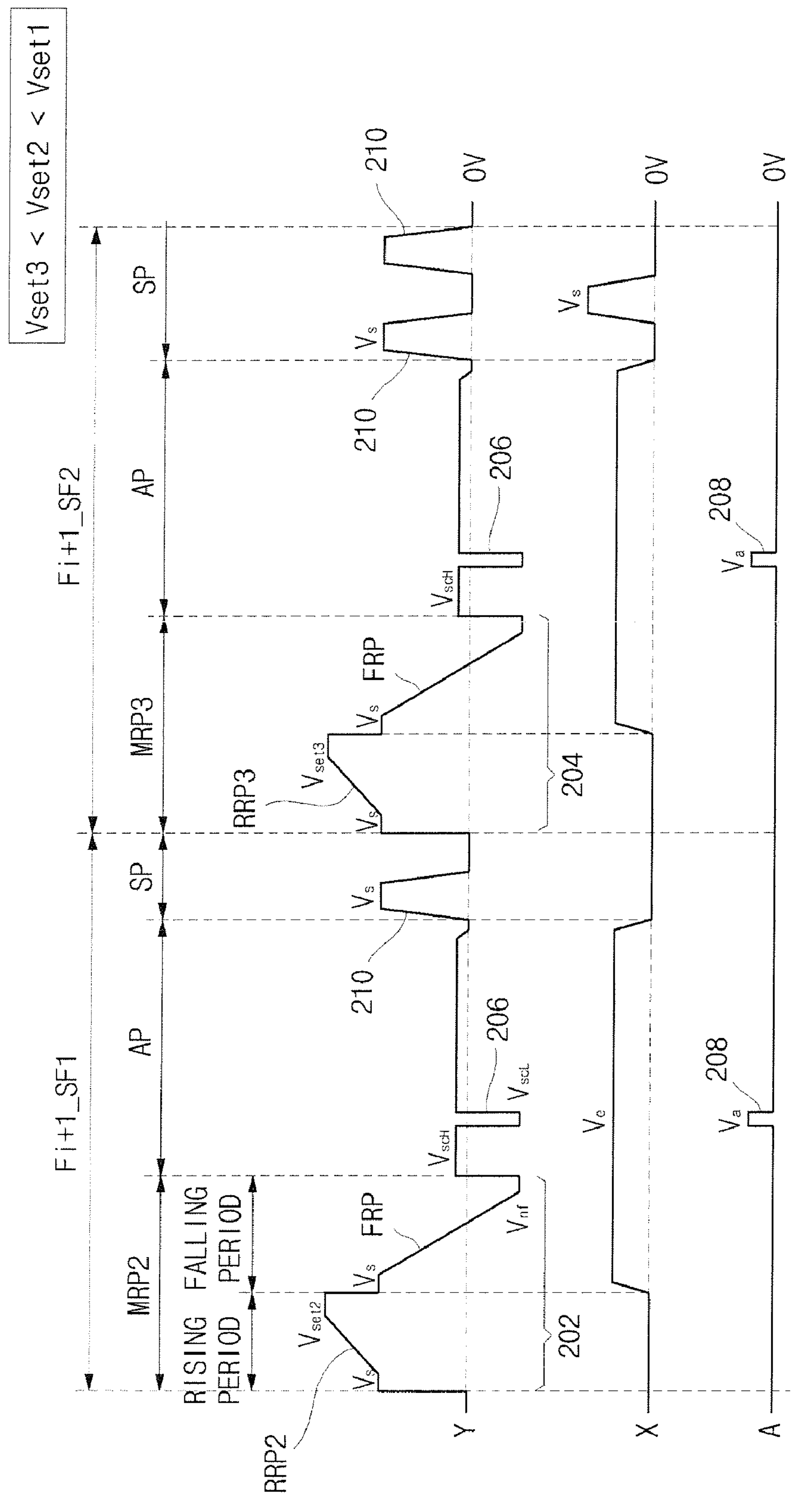

As shown FIG. 2B, the second main reset period MRP2 can be divided into a rising period and a falling period. During the second main reset period MRP2, the second main reset pulse 202 is supplied. The second main reset pulse 202 includes a second rising ramp pulse RRP2 and a falling ramp pulse FRP. During the rising period, a voltage of the second rising ramp pulse RRP2 is increased from a voltage Vs to a voltage Vset2.

The voltage of the second rising ramp pulse RRP2 increases for a shorter period of time than the voltage of the first rising ramp pulse RRP1. In other words, the rising period, of the first main reset pulse MRP1, is longer than the rising period of the second main reset pulse MRP2. In addition, the voltage Vset2 can be lower than the voltage Vset1.

Specifically, in the rising period of the second main reset period MRP2, the second rising ramp pulse RRP2 is supplied to a scan electrode Y, while the sustain electrode X is maintained as the reference voltage 0V. Thereafter, a weak discharge occurs between the scan electrode Y and the sustain electrode X and between the scan electrode Y and the address electrode A. Meanwhile, the voltage applied to the scan electrode Y increases. The intensity of the discharge, due to the second rising ramp pulse RRP2, is weaker than the discharge due to the first rising ramp pulse RRP1. As a result, an amount of reset (background) light generated in cells, by the second rising ramp pulse RRP2, in which the intensity of the discharge is relatively weaker, is less than an amount of background light generated in cells by the first rising ramp pulse RRP1. The weaker discharge creates a relatively reduced black luminance (background light emission).

As shown FIG. 2B, in the third main reset period MRP3 the third main reset pulse 204 is supplied. The third main reset period MRP3 includes a third rising ramp pulse RRP3 and a falling ramp pulse FRP. The voltage of the third ramp pulse RRP3 increases for a shorter period of time than that of the second rising ramp pulse RRP2. Specifically, during a rising period of the third main reset period MRP3 the voltage of the third rising ramp pulse RRP3 increases from the voltage Vs to a voltage Vset3, which is lower than the voltage Vset2.

The third main reset pulse 204 is supplied to the scan electrode Y, while the sustain electrode X is maintained as the reference voltage 0V. Thereafter, a weak discharge occurs between the scan electrode Y and the sustain electrode X, and between the scan electrode Y and the address electrode A, while the voltage of the scan electrode Y increases. The intensity of a discharge, due to the third rising ramp pulse RRP3, is weaker than the intensity of the discharge due to the second rising ramp pulse RRP2. As a result, an amount of background light generated in cells, by the third rising ramp pulse RRP3, is less than an amount of background light generated by the second rising ramp pulse RRP2. The weaker discharge creates a relatively reduced black luminance, thereby improving contrast and dark room viewing.

The first rising ramp pulse RRP1, the second rising ramp pulse RRP2, and the third rising ramp pulse RRP3 can have the same slope or can have different slopes. For example, the slope of the first rising ramp pulse RRP1 may be set to be larger than the slope of second rising ramp pulse RRP2, and the slope of the second rising ramp pulse RRP2 may be set to be larger than the slope of third rising ramp pulse RRP3.

As shown in FIGS. 2A and 2B, the main reset periods MRP1, MRP2, and MRP3 include falling periods. During the falling periods, falling ramp pulses FRP occur. The falling ramp pulses FRP are each a drop in a voltage, from the voltage Vs to the voltage Vnf that is supplied to the scan electrode Y. A voltage Ve is supplied to the sustain electrode X during the falling ramp pulses FRP. Therefore, a weak discharge occurs between the scan electrode Y and the sustain electrode X, and between the scan electrode Y and the address electrode, while the voltage of the scan electrode Y is decreased. The drop in voltage initializes the discharge cells.

In the sub-rest periods SRP, of the sub-fields other than the sub-fields including the main reset periods MRP1, MRP2, and MRP3, a sub-reset pulse is supplied. The sub-reset pulses may have a voltage that rises from the voltage Vs to a voltage lower than the voltage Vset3. The sub-reset pulses are supplied to the scan electrode Y. The sub-reset pulses can include a falling pulse, which gradually decreases from the voltage 0V to the voltage Vnf. The sub-reset pulses may include only a falling pulse that gradually decreases from the reference voltage 0V to the voltage Vnf, supplied the scan electrode Y. These sub-reset pulses cause the sustain-discharged cells, in a previous sub-field, to be reset-discharged.

In the address period AP, the discharge cells to be turned on are selected using a scan pulse 206. The scan pulse 206 has a voltage VscL and is applied to the scan electrode Y. An address pulse 208, having the voltage Va, is applied to the address electrode A, while the voltage of the sustain electrode X is maintained at the voltage Ve. A voltage VscH, which is higher than the voltage VscL, is applied to the scan electrode Y, which is not selected. The reference voltage 0V is applied to the address electrode A, which is not turned on. Thereafter, an address discharge occurs in the discharge cells including the address electrode A, to which the voltage Va is applied, and the scan electrode Y, to which the voltage VscL is applied.

In the sustain period SP, sustain pulses 210, of the voltage Vs, are alternatively supplied to the scan electrode Y and the sustain electrode X. This sustain pulses 210 causes cells, addressed during the address periods AP of each sub-field, to generate a sustain discharge. Herein, the number of sustain pulses 210 is selected based on the weight of each sub-field. For example, the number of sustain pulses 210 is determined based on the intended gradation of a frame.

Figure 3:
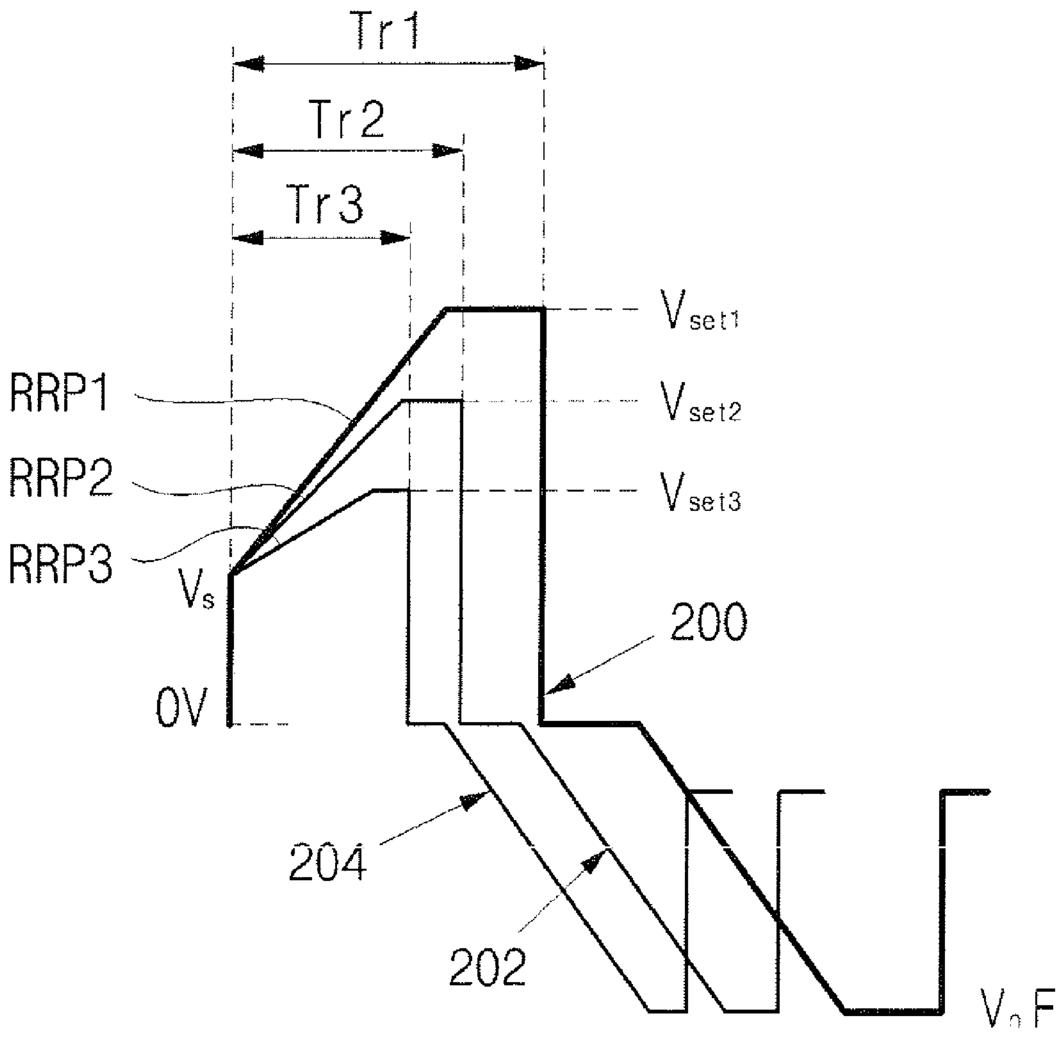
FIG. 3 is a view illustrating main reset pulses shown in FIGS. 2A and 2B.

FIG. 3 is a view describing the main reset pulses 200, 202, and 204, shown in FIGS. 2A and 2B. As shown in FIG. 3, the first rising ramp pulse RRP1, supplied during the main reset period MRP1 has a first rising time Tr1. During the first rising time Tr1, the voltage of the first rising ramp pulse RRP1 increases from the voltage Vs to the voltage Vset1.

The second rising ramp pulse RRP2, supplied during the second main reset period MRP2, has a second rising time Tr2, which is shorter than the first rising time Tr1. During the second rising time Tr2, the voltage of the second rising ramp pulse RRP2 increases from the voltage Vs, or from the reference voltage 0V, to the voltage Vset2. The voltage Vset2 is lower than the voltage Vset1. The third rising ramp pulse RRP3 is supplied during the third main reset period MRP3 and has a third rising time Tr3, which is shorter than the second rising time Tr2. During the third rising time Tr3, the voltage of the third rising ramp pulse RRP3 increases from the voltage Vs to the voltage Vset3. The voltage Vset3 is lower than the voltage Vset2. The voltages Vset1, Vset2, and Vset3 can be referred to as maximum voltages. The various rising times can be referred to as rising periods.

The above-described first to third rising times Tr1, Tr2, and Tr3 are set to satisfy Equation 1.

$$2\times Tr1 > Tr2+Tr3 \geqq Tr1 \quad \text{Equation 1}$$

Referring to Equation 1, the rising time Tr2+Tr3, of the rising ramp pulse RRP2+RRP3, supplied during the main reset period MRP2+MRP3 of the (i+1)th frame, is set to be greater than or equal to the rising time Tr1, of the rising ramp pulse PPR1, supplied in the main reset period MRP1, of the ith frame. The background light produced during the ith frame is approximately the same as the background light of the (i+1)th frame. The rising time Tr2+Tr3 is less than twice the rising time Tr. If the rising time Tr2+Tr3 is longer than twice the rising time Tr1, the time difference between the main reset period MRP1 and the main reset period MRP2+MRP3 can be large enough to produce problems in an image.

A large time difference between the main reset periods MRP1 and MRP2+MRP3, can result in the timing of the sustain period, at a later part of the (i+1)th frame, being delayed more than the timing of the sustain period at a later part of the ith frame. Therefore, the timing of the sustain period at the later part of the (i+1)th frame becomes largely different from the timing of the sustain period at the later part of the ith frame. In other words, the time period in which frame Fi is displayed is shorter than the time period in which frame Fi+1 is displayed. Accordingly, an emitting time of light generated by the sustain discharge, during the last sustain period of the (i+1)th frame, becomes out of sync with an emitting time of light generated by the sustain discharge in last sustain period of the ith frame. If the emitting time of light generated by the sustain discharge during the last sustain period of the (i+1)th frame and emitting time of light generated by the sustain discharge in last sustain period of the ith frame become largely out of sync each other, a flicker occurs in a screen, thereby deteriorating the image quality.

The amount of the light generated during the rising times (Tr1, Tr2, and Tr3) of the first to third rising ramp pulses RRP1, RRP2, and RRP3, set by the above-described Equation 1, can be described as follows.

$$2\times\text{light of } RRP1 > \text{light of } RRP2 + \text{light of } RRP3 \geqq \text{light of } RRP1 \quad \text{[Equation 2]}$$

As described above, the ith frame Fi, to which the main reset pulse having the first rising ramp pulse RRP1 is supplied, and the (i+1)th frame Fi+1, to which the main reset pulse having the second and third rising ramp pulses RRP2 and RRP3 is supplied, are sequentially displayed. Therefore, in the plasma display device according to aspects of the present invention, the reset discharges are stably generated, since two main reset pulses are supplied during the (i+1)th frame Fi+1. Further, the plasma display device may reduce the difference between the black luminance generated by the first rising ramp pulse RRP1, and the black luminance generated by the second and third rising ramp pulses RRP2 and RRP3. Furthermore the plasma display device can reduce the black luminance by using the second and third rising ramp pulses RRP2 and RRP3, rather than using the same main reset pulse for two consecutive frames.

In FIGS. 1A to 3, one main reset pulse is supplied to the ith frames, and two main reset pulses are supplied to the (i+1)th frames. However, the present invention is not limited thereto. That is, any number of additional main reset pulses can be supplied to the (i+1)th frames, so long as more main reset pulses are supplied to the (i+1)th frames than are supplied to the ith frames.

Figure 4:
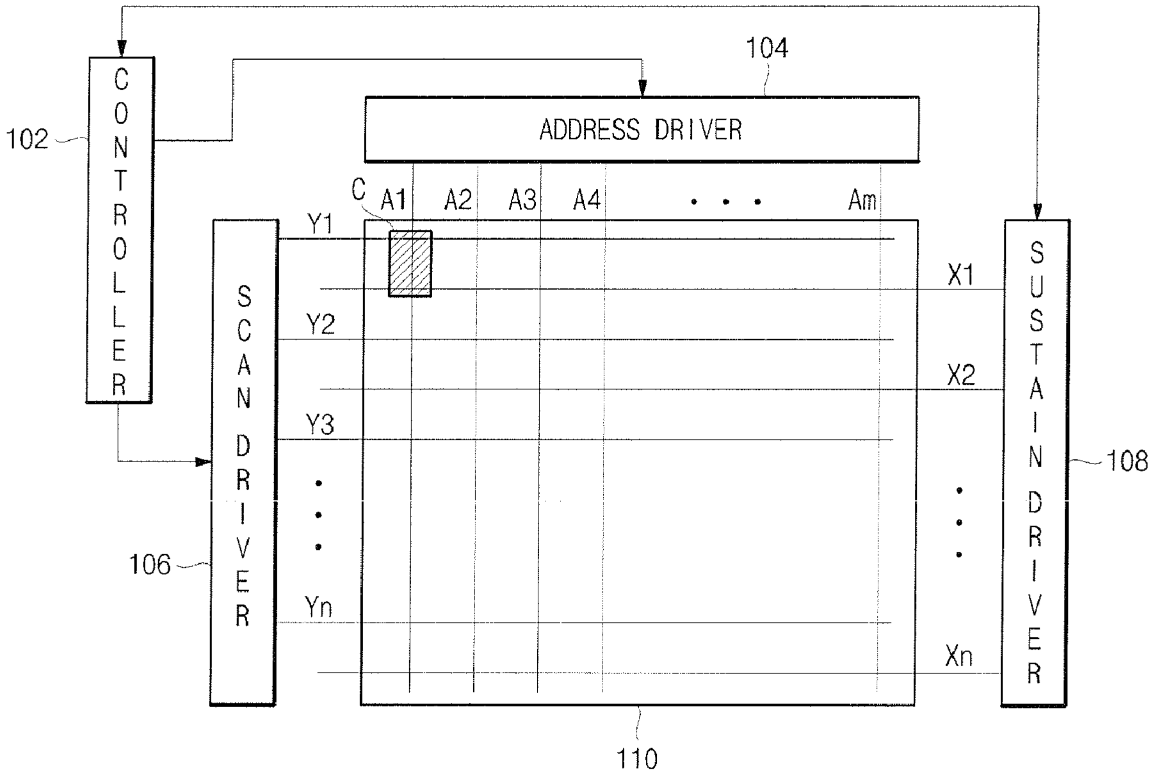
FIG. 4 is a block diagram illustrating a plasma display device, according to aspects of the invention.

FIG. 4 is a block diagram illustrating a plasma display device 100, according to an exemplary embodiment of the invention. The plasma display device 100 includes: a plasma display panel 110, where an image is formed; an address driver 104, which supplies data to address electrodes A1 to Am, of the plasma display panel 110; a scan driver 106, which drives scan electrodes Y1 to Yn; a sustain driver 108, which drives sustain electrodes X1 to Xn; and a controller 102, which controls each of the drivers 104, 106, and 108.

The plasma display panel 110 displays an image, using a plurality of discharge cells C arranged in a matrix. The display panel 110 includes: a plurality of address electrodes A1 to Am that extend in a first direction; a plurality of scan electrodes Y1 to Yn that extend in a second direction; and a plurality of sustain electrodes X1 to Xn that extend in the first direction and are paired with each of the scan electrodes Y1 to Yn. Herein, the address electrodes A1 to Am intersect the scan electrodes Y1 to Yn and the sustain electrodes X1 to Xn.

The controller 102 divides the ith frames and the (i+1)th frames into a plurality of sub-fields, and alternatively drives the ith frames and the (i+1)th frames. Each of the sub-fields is divided into a reset period, an address period, and a sustain period, that encompass operational changes on the plasma display device 100, over time.

The controller 102 receives a vertical/horizontal synchronization signal, to generate an address control signal, a scan control signal, and a sustain control signal, which are used to drive each of the drivers 104, 106, and 108. The generated control signals are supplied to the corresponding drivers 104, 106, or 108, such that the controller 102 controls the operation of each of the drivers 104, 106, and 108.

The address driver 104 supplies a data signal to each of the address electrodes A, in response to the address control signal received from the controller 102, in order to select a discharge cell to be displayed. The scan driver 106 applies a driving voltage to the scan electrodes Y1 to Yn, in response to the scan control signal received from the controller 102. For example, the scan driver 106 supplies the first main reset pulse during one of the sub-fields of in the ith frame and supplies the sub-reset pulses during the other sub-fields. In addition, the scan driver 106 supplies the second main reset pulse to a sub-field of the (i+1)th frame, supplies the third main reset pulse to the next sub-field to be driven, and supplies the sub-reset pulses to the other sub-fields. The sustain driver 108 applies a driving voltage to the sustain electrodes X, in response to the sustain control signals received from the controller 102.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, in the plasma display device 100 the second and third main reset pulses are supplied during the (i+1)th frames, to stably generate the reset discharges. Further, in the plasma display device 100 it is possible to reduce the difference between the black luminance generated by the first rising ramp pulse, supplied during the ith frames, and the black luminance generated by the second and third rising ramp pulses, supplied during the (i+1)th frames. In addition, in the plasma display device 100 it is possible to reduce the black luminance when the second and third main reset pulses are used, rather than two first main reset pulses, in sequential frames.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of driving a plasma display device driven by dividing one frame into a plurality of sub-fields each comprising a reset period, an address period, and a sustain period, the method comprising:

supplying a first main reset pulse during one of the reset periods that is earliest in time in an ith frame (where i is a natural number); and supplying second and third main reset pulses during consecutive reset periods that are earliest in time in an (i+1)th frame that is alternately displayed with the ith frame, wherein the first main reset pulse has a different duration than the second and third main reset pulses.

2. The method of driving a plasma display device as claimed in claim 1, further comprising supplying a sub-reset pulse during reset periods where one of the first, second, or third main reset pulses is not supplied.

3. The method of driving a plasma display device as claimed in claim 2, wherein:

the first main reset pulse has a first rising period during which a voltage of the first main reset pulse rises from a first voltage to a second voltage, the second main reset pulse has a second rising period during which a voltage of the second main reset pulse rises from the first voltage to a third voltage that is lower than the second voltage, and the third main reset pulse has a third rising period during which a voltage of the third main reset pulse rises from the first voltage to a fourth voltage that is lower than the third voltage.

4. The method of driving a plasma display device as claimed in claim 3, wherein the first rising period is longer than the second rising period, and the second rising period is longer than the third rising period.

5. The method of driving a plasma display device as claimed in claim 4, wherein a sum of the second rising period and the third rising period is smaller than twice the first rising period.

6. The method of driving a plasma display device as claimed in claim 3, wherein an amount of light generated by a discharge due to the first main reset pulse is equal to or less than the sum of an amount of light generated by a discharge due to the second main reset pulse and an amount of light generated by a discharge due to the third main reset pulse.

7. A plasma display comprising:

a plasma display panel;

a controller configured to divide one frame into a plurality of sub-fields each comprising a reset period, an address period, and a sustain period, and to control alternatively driving an ith frame (where i is natural number) and an (i+1)th frame; and a driver configured to supply a first main reset pulse to the plasma display panel during one of the reset periods that is earliest in time in the ith frame and to supply second and third main reset pulses during consecutive reset periods that are earliest in time in the (i+1)th frame, wherein the first main reset pulse has a different duration than the second and third main reset pulses.

8. The plasma display device according to claim 7, wherein the driver is further configured to supply a sub-reset pulse during reset periods where one of the first, second, or third main reset pulses is not supplied.

9. The plasma display device according to claim 8, wherein the first main reset pulse has a first rising period during which a voltage of the first main reset pulse increases from a first voltage to a second voltage, the second main reset pulse has a second rising period during which a voltage of the second main reset pulse increases from the first voltage to a third voltage that is lower than the second voltage, and the third main reset pulse has a third rising period during which a voltage of the third main reset pulse increases from the first voltage to a fourth voltage that is lower than the third voltage.

10. The plasma device according to claim 9, wherein the first rising period is longer than the second rising period and the second rising period is longer than the third rising period.

11. The plasma display device according to claim 10, wherein a sum of the second rising period and the third rising period is smaller than twice the first rising period.

12. The plasma display device according to claim 9, wherein an amount of light generated by a reset discharge due to the first main reset pulse is equal to or less than the sum of an amount of light generated by a reset discharge due to the second main reset pulse and an amount of light generated by a reset discharge due to the third main reset pulse.

13. A method of consecutively driving ith and (i+1)th frames in a plasma display device (where i is a natural number) and the ith and (i+1)th frames are each divided into sub-fields each comprising a reset period, an address period, and a sustain period, the method comprising:

supplying a first main reset pulse during one of the reset periods that is earliest in time in each of the ith frames;

supplying second and third main reset pulses during consecutive reset periods that are earliest in time in each of the (i+1)th frames; and supplying a sub-reset pulse during reset periods where one of the first, second, or third main reset pulses is not supplied, wherein the first, second, and third main reset pulses have respective first, second, and third maximum voltages that are higher than a maximum voltage of each of the sub-reset pulses and, wherein the first main reset pulse has a different duration than the second and third main reset pulses, and the first, second, and third main reset pulses have respective first, second, and third rising periods, where two times the first rising period is greater than the sum of the second and third rising periods.

14. The method of claim 13, wherein the first rising period is longer than the second rising period, and the second rising period is longer than the third rising period.

15. The method of claim 13, wherein the first rising period is equal to the sum of the second and third rising periods.

* * * * *